United States Patent [19]

Lo et al.

[11] Patent Number: 5,261,010
[45] Date of Patent: Nov. 9, 1993

[54] AUTOMATIC MASK THRESHOLD

[75] Inventors: Thomas K. Lo, Temple City, Calif.; Teresa A. Hinkle, Madison, Ala.; Lop G. Ng, Encino; Jack M. Sacks, deceased, late of Thousand Oaks, both of Calif., by Ken DeVries, executor

[73] Assignee: Hughes Aircraft Comany, Los Angeles, Calif.

[21] Appl. No.: 766,318

[22] Filed: Sep. 27, 1991

[51] Int. Cl.$^5$ .......................... G06K 9/62; G06K 9/64; G06K 9/68
[52] U.S. Cl. ........................................ 382/42; 382/30; 382/33; 382/34
[58] Field of Search .................. 382/30, 32, 33, 34, 382/42; 364/728.03, 728.05, 819, 820

[56] References Cited
U.S. PATENT DOCUMENTS

5,020,113 5/1991 Lo et al. ................................ 382/33
5,036,546 7/1991 Gottesman et al. .................. 382/42
5,119,435 6/1992 Berkin ................................... 382/33
5,127,063 6/1992 Nishiya et al. ........................ 382/42

Primary Examiner—Jose L. Couso
Attorney, Agent, or Firm—Charles D. Brown; Randall M. Heald; Wanda Denson-Low

[57] ABSTRACT

An improved method for finding the mask threshold for a maskable bilevel correlator operates on a series of frames of information. Beginning with an initial threshold, two rates are computed. The rate of change of the correlation peak magnitude $P_{(T)}$, a function of threshold T, with respect to the change in the value of the mask threshold T, or $(dP_{(T)}/dT)$, and the corresponding rate of change of correlation reference pixels with magnitude exceeding the mask threshold, $U_{(T)}$, a function of threshold T, with respect to the change in the value of the mask threshold T, or $(dU_{(T)}/dT)$, are measured. The correct, or best, value of the threshold occurs when $|dP_{(T)}/dT| \geq 0.5*|dU_{(T)}/dT|$.

19 Claims, 5 Drawing Sheets

VARIATION OF U (UNMASKED PIXELS) AND P (CORRELATION PEAK) WITH RESPECT TO T (MASK THRESHOLD)

FIG. 5

SELECTION OF MASK THRESHOLD ($T_0$) FROM $\frac{dU}{dT}$ AND $\frac{dP}{dT}$

FIG. 6

AUTOMATIC MASK THRESHOLD

BACKGROUND OF THE INVENTION

1. Technical Field

This invention relates to image processing techniques and, more particularly, to improved techniques for matching patterns using area correlators.

2. Discussion

Area correlation is an important signal processing function in many image processors. Applications include trackers, pattern recognizers, scene stabilizers, and sensor line of sight alignment. Traditionally area correlation has been implemented using either greylevel product correlation or bilevel correlation. These two techniques represent opposite extremes in the performance/complexity tradeoff.

Generally, a product correlator performs the matching function by multiplying each pixel in a reference image with a corresponding pixel in a live image and accumulating the sum of the products. The demands of the sensor imaging rate, typically 60 Hz, often require parallel processing in hardware. The associated high cost, high power consumption and bulky hardware is unsuitable. In addition, the large amount of multiplications also limits the search range of the correlator.

The bilevel correlator performs a matching function by comparing the polarity of the spatial gradient between the reference image and the live image. A gradient operator generates the polarity of the spatial gradient for each pixel. The match function is computed by accumulating the number of pixel pairs in the two images with polarity coincidence.

The problem with conventional bilevel correlators is that for pixels in bland portions of the reference image, where the scene content is relatively uniform and the amplitude of the gradient is small, the polarity of the gradient often is dominated by noise. Statistically, the noisy pixels can add or detract from the correlation function with equal probability. Thus the inclusion of noisy pixels does not add to the mean peak of the correlation function but increases its variance, and reduces the signal to noise ratio at the output of the correlator. In bland scenes, the noisy pixels can overwhelm the number of signal-occupied pixels, causing the bilevel correlator to perform poorly.

An improvement in the performance of bilevel correlation is disclosed in pending U.S. patent application Ser. No. 229,407 filed on Aug. 8, 1988 and assigned to the assignees of the instant application. This pending U.S. application entitled "maskable Bilevel Correlator" retained the advantageous features of the bilevel correlator while alleviating the problems of noisy pixels. The automatic correlatable area selection technique selects areas having a high density of signal-occupied pixels for reference areas to enhance correlator performance in bland scenes.

To accomplish this, signals representing the live image and reference image are differentiated and thresholded to provide a polarity bit and mask bit for each pixel position. The value of the mask bit is an "off" digital state if the amplitude of the analog signal falls between two preselected threshold levels and is an "on" digital state if the amplitude is greater than the threshold levels. The value of the polarity bit depends upon whether the amplitude of the signal is positive or negative with respect to the level from which the thresholds are established. The polarity bits and mask bits of the resultant images generate a correlation function in which the polarity bit values are ignored for those pixel positions having mask bits in the "off" condition.

SUMMARY OF THE INVENTION

This invention includes an improved method of finding the mask threshold for a maskable bilevel correlator. The system and process of the present invention examines two quantities simultaneously. First, the rate of change of the correlation peak magnitude $P_{(T)}$, which is a function of threshold T, with respect to the change in the value of the mask threshold T, also known as the quantity $(dP_{(T)}/dT)$ is measured. Second, the corresponding rate of change of correlation reference pixels with magnitude exceeding the mask threshold, $U_{(T)}$, a function of threshold T, with respect to the change in the value of the mask threshold T, also known as the quantity $(dU_{(T)}/dT)$ is measured at the same time. These values are computed as necessary for each of a series of frames of information, each frame having a series of rows and columns of pixels. The rates of change are analyzed to find the value appropriate to the scene to be correlated. The correct, or best, value of the threshold occurs when $|dP_{(T)}/dT| \geq 0.5^*|dU_{(T)}/dT|$.

BRIEF DESCRIPTION OF THE DRAWINGS

The various advantages of the present invention will become apparent to one skilled in the art upon studying the following specification and by reference to the drawings in which.

DESCRIPTION OF THE PREFERRED EMBODIMENT

Almost all correlators work on the premise that the reference image is a subimage of a larger image called the live image. It is the function of the correlator to locate the portion of the live image which most nearly resembles the reference image. The correlator performs this function by successively superimposing the reference image on the live image with successively different offsets and computing a measure of similarity at each offset. The similarity measure is called the correlation function. The position of the global maximum of the correlation function yields a best estimate of the offset between the reference image and the live image.

Figure 1:
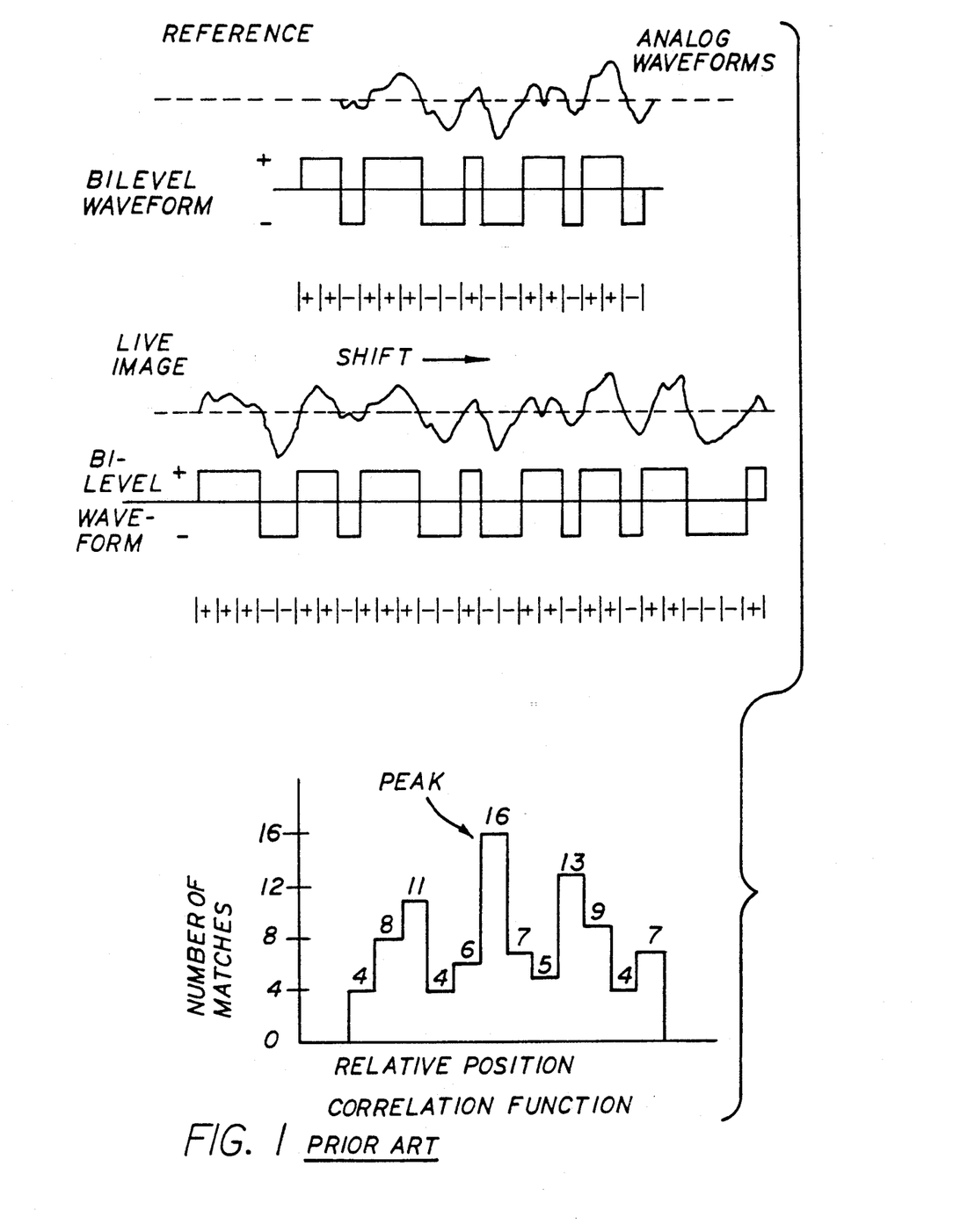
FIG. 1 comprises waveforms and graphs helpful in understanding the general correlation function of the prior art.

The bilevel correlation function is developed by accumulating the number of pixels with coincident polarity between the two images as shown in FIG. 1. Note that in the comparison made in FIG. 1, each pixel is used in the matching process and assigned equal weight. In those pixels where the signal magnitude is smaller than the noise, the polarity assigned to the pixel is determined by the polarity of the noise. These pixels are equally likely to be positive or negative in polarity. Since the noise is independent from one image to the next image, the noise dominated reference pixels are as likely to match or mismatch the corresponding pixels in the live image. Statistically, these pixels do not contribute to the magnitude of the correlation peak but increase the variance or the fluctuation of the peak magnitude.

Figure 2:
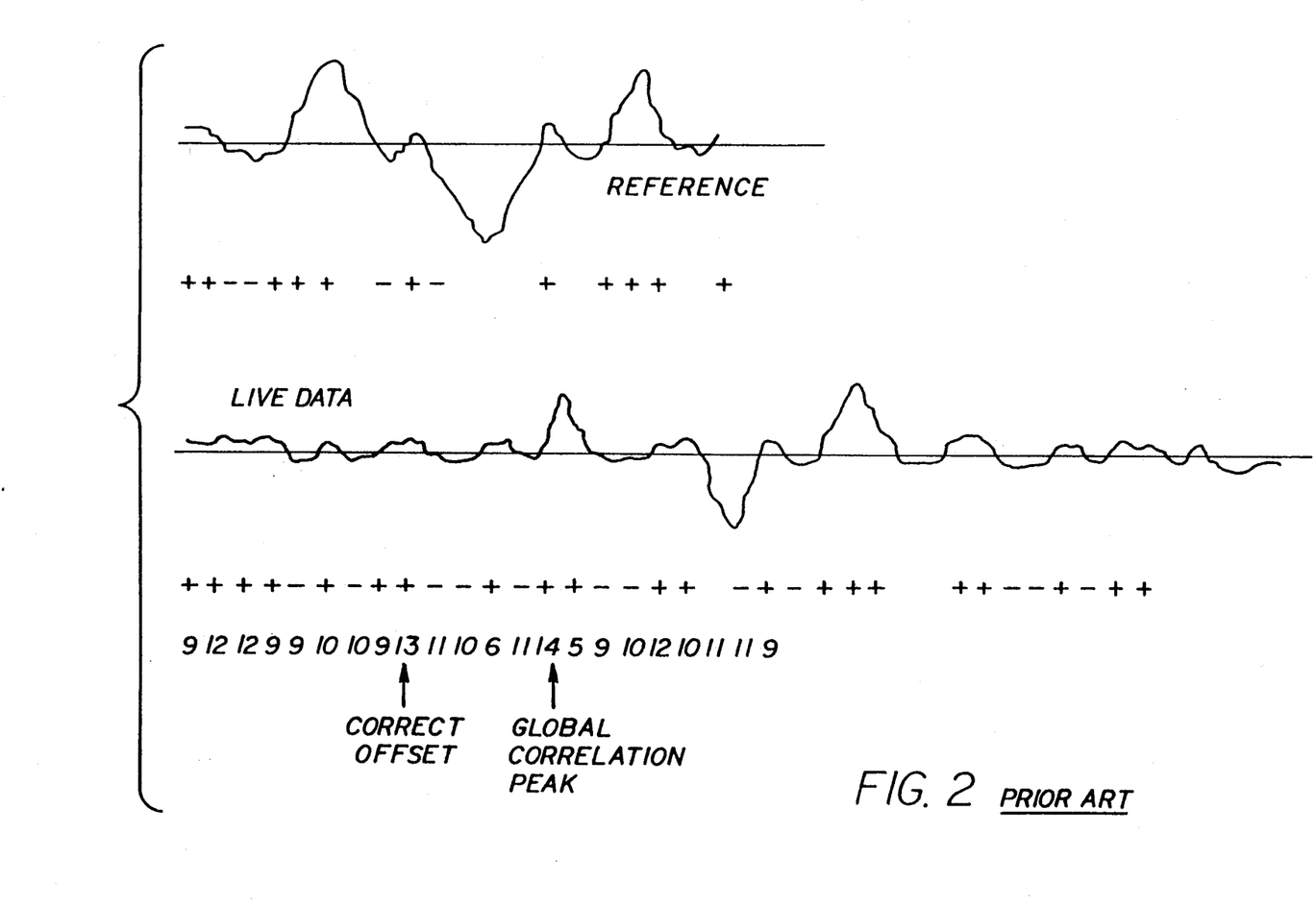
FIG. 2 similarly consists of waveforms and associated indicia helpful in understanding problems associated with prior art correlators when the live image is relatively bland.

In bland scenes where the bulk of the reference pixels are noise dominated as shown in FIG. 2, the fluctuations of the peak magnitude can be so large relative to the mean peak that the correlation function's peak position no longer indicates the true offset between the two images. This bland scene problem had been mitigated in a conceptually very simple manner. Since the noise dominated pixels do not contribute toward enhancing the magnitude of the correlation peak but increases its statistical fluctuation, they degrade the correlator's ability to correlate, and should be excluded from the correlation process. Instead of using every pixel in the reference image in the correlation process, the noise dominated pixels are ignored by computing a pair of thresholds that were placed at $k\sigma$ about the mean gradient amplitude of the input scene and masking out those pixels having an intensity less than the thresholds. k is a constant typically in the range of 1 to 2 and $\sigma$ is the standard deviation of the noise in the image. The system and process of the present invention improves upon the setting of the mask threshold level.

The method discussed in the previous paragraph indicates that the mask threshold was set manually by the operator based on noise. This method ignores the scene content, requires trained operators, and lacks setting consistency between operators.

Those pixels having a magnitude between the threshold pairs have a low signal-to-noise ratio and are masked off. Pixels having a magnitude outside of the region bounded by the threshold pair have good signal-to-noise ratio and are unmasked. Functionally, only unmasked pixels are used in the correlation process.

Figure 3:
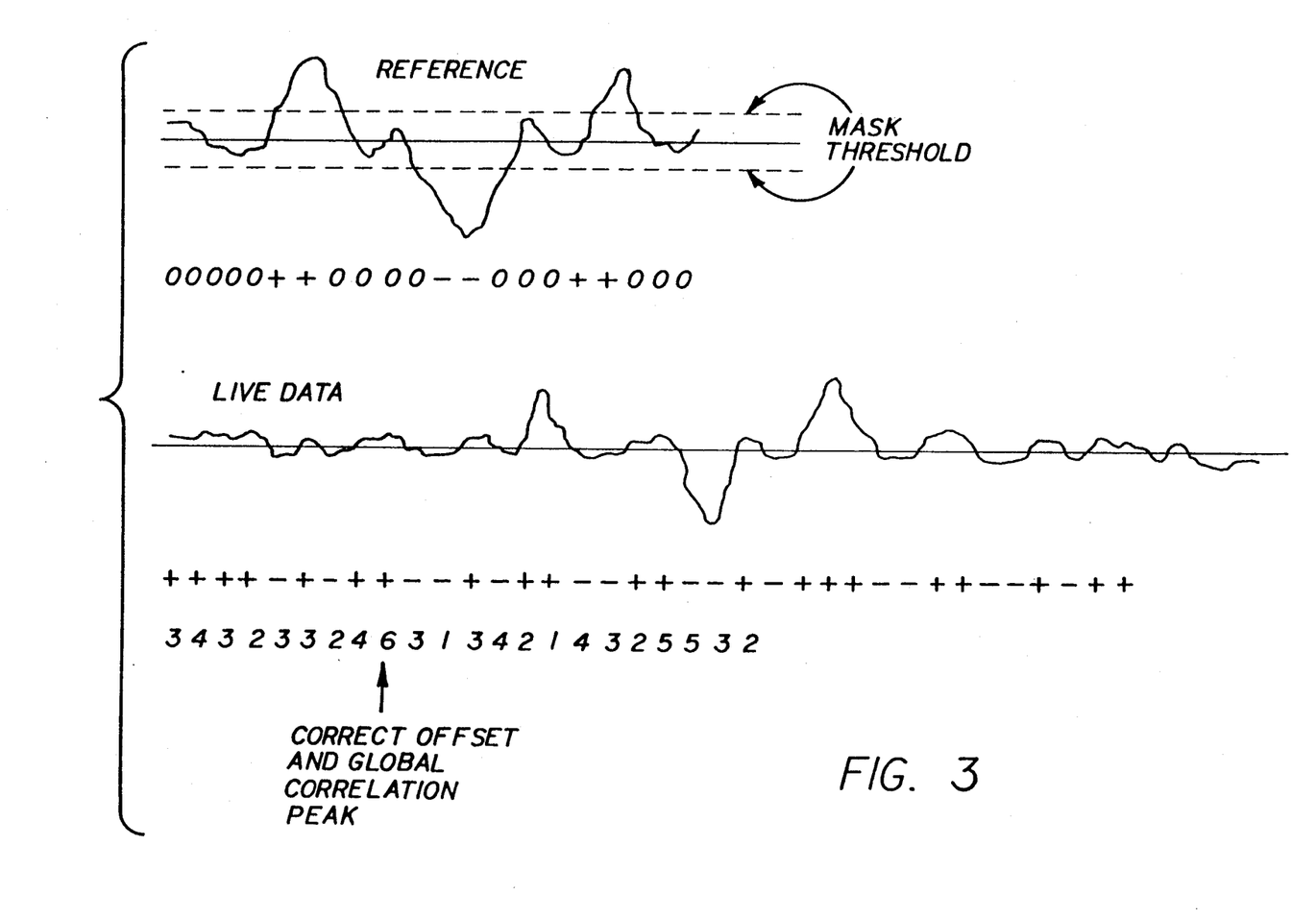
FIG. 3 illustrates bilevel masking of a reference signal in comparison with a live data signal.

The process of masking is illustrated in FIG. 3 where a "0" designates a pixel which has been masked off. In the correlation process the masked pixels are ignored. The ignoring of the masked pixels is accomplished by designating each pixel with a mask bit or a polarity bit. The polarity bit designates the polarity of the gradient when the intensity of the bit is outside the threshold limits. The mask bit takes on the value "0" for masked pixels and the value "1" for unmasked pixels. In the convolution process the polarity bits are logically compared using "exclusive nor" as is usual with the bilevel correlator. The output of the "exclusive nor" is a "1" for polarity coincidence and a "0" for the lack of coincidence. The output of the "exclusive nor" is logically "ANDed" with the mask bit for the reference pixel. For a pixel with mask bit "0", the output of the "AND" function will always be a "0" independent of the polarity coincidence of the pixel pair being compared. When the mask bit is a "1," the output is a "1" when the polarities coincide. FIG. 3 illustrates the correlation function obtained with the maskable bilevel correlator using the same waveform as FIG. 2. Note that the bilevel correlation peak in FIG. 2 indicated the wrong offset whereas the maskable bilevel correlator of FIG. 3 yields the correct result. By virtue of the masking feature, the maskable bilevel correlator is able to push the operation limit of the correlator to scenes that are too bland for a non-masked bilevel correlator to work.

Figure 4:
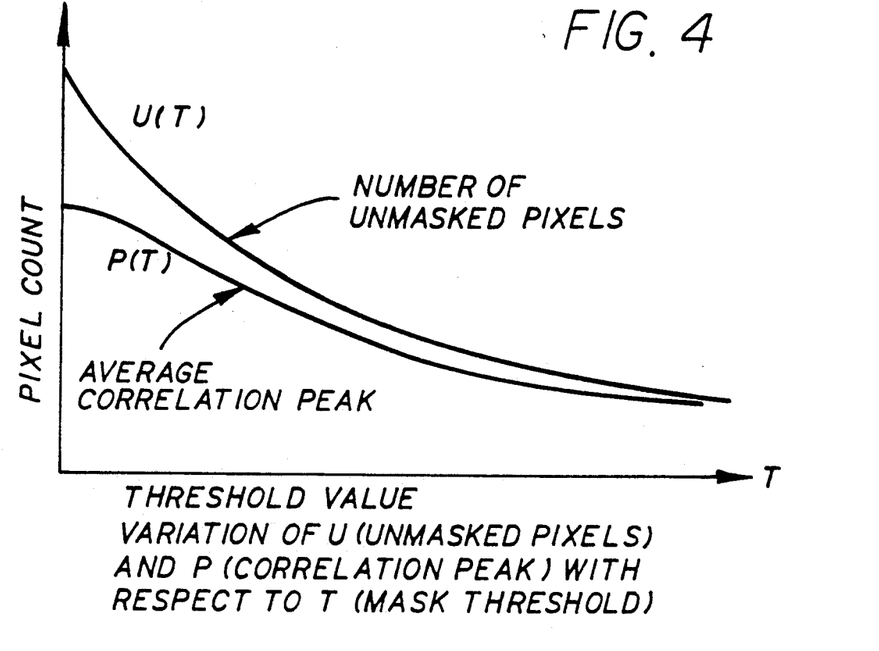
FIG. 4 illustrates the variation of the unmasked pixels and correlation peak with respect to the masked threshold.

The system and process of the present invention enables the computation, in a scene adaptive manner, of the quantization boundary, or mask threshold, for both trilevel and maskable bilevel correlators. Referring to FIG. 4, a plot of the number of unmasked pixels $U_{(T)}$ versus the threshold T is shown to be a function of threshold T, and to decline with increasing T. Similarly, the average correlation peak $P_{(T)}$ versus the threshold T is also shown to be a function of threshold T, and to decline with increasing T.

Both the location and shape of $U_{(T)}$ and $P_{(T)}$ are more dissimilar near the left side of FIG. 4, but asymptotically approach each other as they extend to the right of FIG. 4. This is logically consistent since more noise-dominated pixels will be unmasked for the lowest threshold, and the magnitude of the average correlation peak will lessen with increasing thresholds since there will be fewer pixels to correlate.

Figure 5:
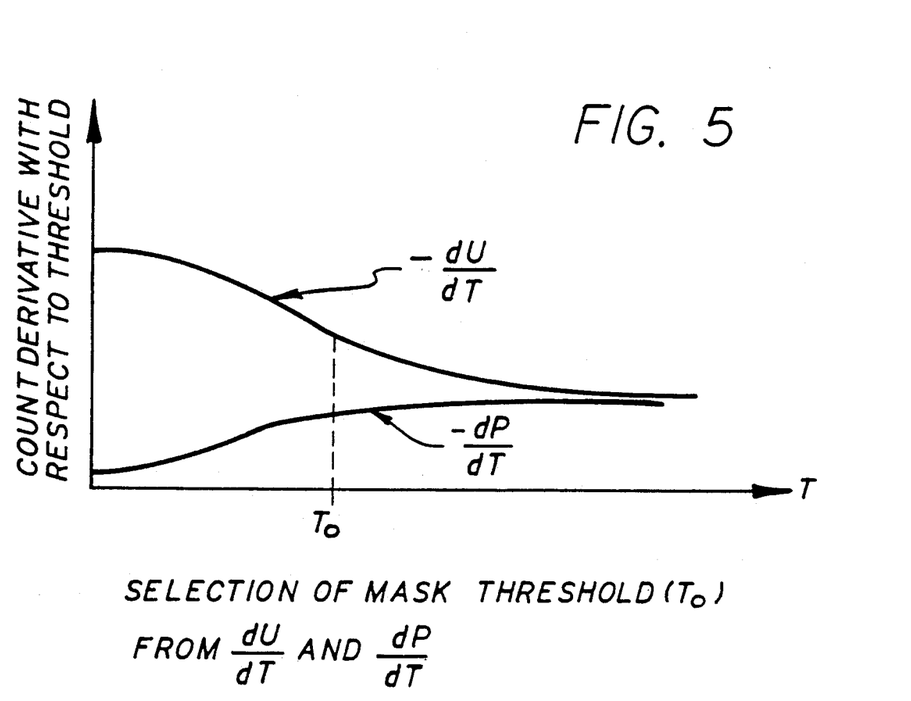
FIG. 5 is a graphical illustration of the derivative of the unmasked pixels and the derivative of the correlation peak with respect to the selected mask threshold.

Referring to FIG. 5, the derivatives or the slopes of the number of unmasked pixels $U_{(T)}$ versus the threshold T and the slopes of the average correlation peak $P_{(T)}$ versus the threshold T, are plotted versus the threshold T, and are shown to decline with increasing T. As is illustrated in FIG. 5, a threshold level $T_o$ is selected at the point where the vertical level of $(dU_{(T)}/dT)$ is twice the vertical level of $(dP_{(T)}/dT)$.

In the present invention the value of the mask threshold is derived directly from the peak value of the correlation. A number of trial mask threshold values (T) are applied successively to several images. For each trial value of T, a reference image is extracted and the number of unmasked pixels $U_{(T)}$ is recorded. The reference extracted from one image is correlated with the next several images. Because the time interval between successive images is short relative to the correlation time of the scene, the signal contents of the two successive images are essentially identical (i.e. totally correlated). Hence, all corresponding signal dominated pixels in the reference and live images will match in the correlation process. On the other hand, noise dominated pixels, on the average, will not add to the correlation peak. The value of the correlation peak $P_{(T)}$ therefore, is a measure of the number of signal dominant pixels used in the correlation process.

In the present invention, the mask threshold $T_o$ is found by measuring the rate of change of $P_{(T)}$ with respect to T ($dP_{(T)}/dT$), and the rate of change of $U_{(T)}$ with respect to T ($dU_{(T)}/dT$) Specifically, $T_o$ is determined by finding the value of T such that the magnitude of $dU_{(T)}/dT$ is approximately twice that of $dP_{(T)}/dT$.

In addition, correlations performed over a long period of time are usually performed for tracking where the perspective view of the image is either unchanging or increasing in size, which in turn corresponds to an unchanging or increasing signal to noise ratio. It is therefore reasonable that the signal contents over time will reach steady state and be identical.

Hence, all pixels in both the reference image and the live image, which are signal dominated, will match in the correlation process. The noise dominated pixels will, on the average, not add to the correlation peak. The value of the correlation peak $P_{(T)}$ therefore is a measure of the number of signal dominant pixels used in the correlation process. The system and method of the present invention finds the mask threshold $T_o$ by measuring the rate of change of $P_{(T)}$ with respect to T or $(dP_{(T)}/dT)$, and the rate of change of $U_{(T)}$ with respect to T, or $(dU_{(T)}/dT)$. $T_o$ is determined by finding the value of T such that the magnitude of $dU_{(T)}/dT$ is approximately twice that of $dP_{(T)}/dT$.

The underlying ideas behind the aforementioned algorithm are as follows. In general, all pixels in an image contain noise and varying amounts of signal. Generally the noise fluctuates about zero, assuming that the noise is zero mean noise. Those pixels which have signal content will have an average value that is non-zero. The stronger the signal, the larger the deviation from zero.

When a mask threshold T is applied, all pixels with intensity I in the range $-T<I<T$ are mapped into state 0. All other pixels are mapped into states $+1$ or $-1$ according to their polarity. The number of pixels in the reference image that are not mapped into state 0 defines the number $U_{(T)}$, the subscript indicating a dependence on the threshold level. Since noise is zero mean, most of the pixels that get mapped in state 0 for small values of threshold T tend to be noise dominated pixels. The pixels that contribute to the correlation peak $P_{(T)}$ are the signal dominated pixels having a high signal-to-noise ratio. The pixels with large signal-to-noise ratios tend to have large intensity and therefore are not masked out or mapped into state 0 at low threshold values. As shown previously, the magnitude of the correlation peak is also dependent upon the threshold level, thus the subscript similarly indicating dependence.

Therefore, at small values of T the value of $P_{(T)}$ is relatively insensitive to T whereas the number of unmasked pixels, $U_{(T)}$ is rapidly reduced by increasing T due to the removal of noise dominated pixels. As the value of T is increased, most of the noise dominated pixels are removed and pixels that are signal dominated also start to get masked out. The number of signal dominated pixels that survive is indicated in part by the correlation peak, $P_{(T)}$ since a lesser number of surviving signal dominated pixels will reduce the magnitude of the correlation peak. The expected variation of $P_{(T)}$ and $U_{(T)}$ with respect to T, as this process is carried out, was previously shown in FIG. 4. The number of signal dominated pixels that are marginally removed by an increase in T is measured by $dP_{(T)}/dT$. The total number of pixels that are marginally removed by an increase in T is measured by $dU_{(T)}/dT$.

One can further subdivide the unmasked pixels $U_{(T)}$ into signal dominated pixels S and noise dominated pixels N and rewrite $(dU_{(T)}/dT)=(dS_{(T)}/dT)+(dN_{(T)}/dT)$. When the value of T is such that $(dS_{(T)}/dT)=(dN_{(T)}/dT)$, the number of signal dominated pixels removed is the same as the number of noise dominated pixels removed. Increasing T beyond this value will result in a larger marginal removal of $S_{(T)}$ than $N_{(T)}$ and decreasing T will let in more $N_{(T)}$ than $S_{(T)}$. The number of signal dominated pixels $S_{(T)}$ is proportional to the correlation peaks $P_{(T)}$, since the correlation peak pixels are those which are essentially verified as being signal dominated. Since both $P_{(T)}$ and $S_{(T)}$ are functions of the threshold and the number of signal dominated pixels, $P_{(T)}$ when used in proper proportion is a good substitute when $S_{(T)}$ is not known. The value of T at which $|(dP_{(T)}/dT)| \geq 0.5*|(dU_{(T)}/dT)|$ is a good value for setting the mask threshold. The selection of the mask threshold using $(dP_{(T)}/dT)$ and $(dU_{(T)}/dT)$ according to the above relation is shown and verified graphically in FIG. 5.

Figure 6:
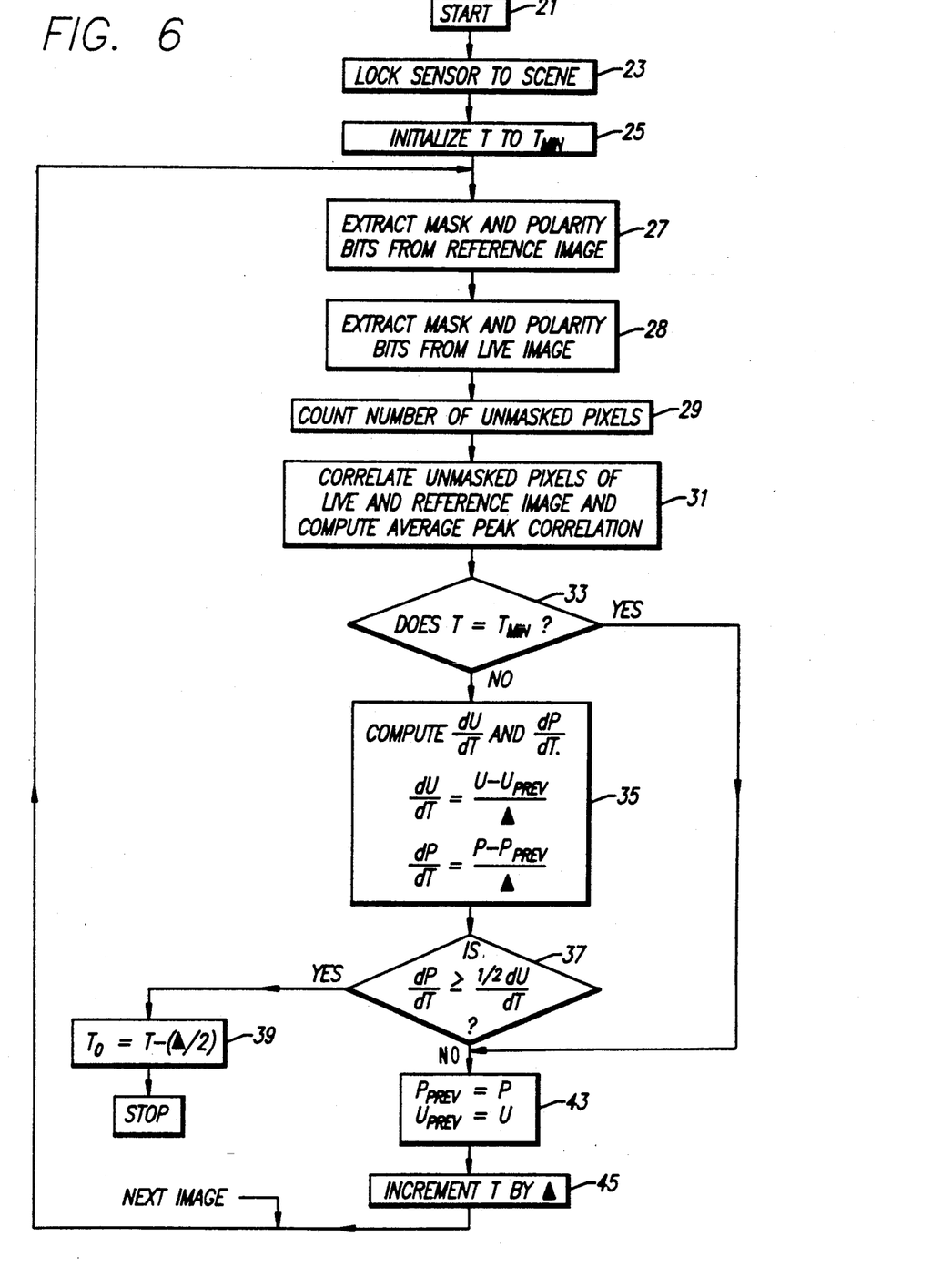
FIG. 6 illustrates a flowchart illustrating the logic of the system and method of the present invention.

In a preferred embodiment, the automatic mask threshold selection process is implemented using a maskable bilevel correlator in conjunction with an imaging sensor. A flowchart of the implementation is shown in FIG. 6. The first step is to lock the sensor into a fixed position onto the scene for which subsequent correlation is to be performed. A fixed portion of the field of view is designated to be used as the correlation reference image for subsequent correlations.

The mask threshold is initially set to a minimum level $T_{min}$ and the incremental value for the threshold is preset to $\blacktriangle$ = ideally, a fixed multiple of the noise. Typically, $\blacktriangle$, or delta, is one-half the standard deviation the noise of the input images.

First, the minimum threshold $T=T_{min}$ is applied to the first image to define the mask and polarity bits for each pixel. A portion of the first image is then extracted from the first image to form a correlation reference. The number of unmasked pixels in the reference $U_{(T)}$ is then extracted and stored. The extracted correlation reference is then used to correlate against the next N images and an average correlation peak value is then computed. For example, if N=5 images, Then images 2, 3, 4, 5 and 6 would be correlated against the first, or stored reference image and the average peak $P_{(T)}$ is computed by the formula $\{P_{(T)}=(P_{(2)}+P_{(3)}+P_{(4)}+P_{(5)}+P_{(6)})/5\}$ where $P_T$ is the average value of the correlation peak value resulting from correlating a set of N images against a reference image. Once the first set of correlations using the first reference with the next N images has been performed (N+1 images having then been used), the threshold T is now incremented by the amount and is applied to the next image (image number N+2) to define a new mask and polarity bit pattern set. A new reference is now extracted from this image and the number of unmasked pixels for this reference and threshold is now extracted and stored as the new $U_{(T)}$. This new reference is correlated against the next N images and the $P_{(T)}$ for the current threshold value T is again computed. By comparing the change in $P_{(T)}$, $U_{(T)}$ and threshold T over the most recent two values of T, the quantities $dP_{(T)}/dT$ and $dU_{(T)}/dT$ are computed and tested for the condition $|dP_{(T)}/dT| \geq 0.5*|dU_{(T)}/dT|$. If the condition does not hold, T is incremented by $\blacktriangle$ and the process is repeated.

After each frame is thresholded and correlated, the mask threshold is then incremented by to form a new threshold T. The value of $U_{(T)}$ for the current T is then extracted. Again, a new value of $P_{(T)}$ for the current T is obtained by averaging the correlation P over the next n images. After the average value of P is obtained, the derivatives $(dU_{(T)}/dT)$ and $(dP_{(T)}/dT)$ are obtained using the approximations $$dU_{(T)}/dT=(U_{(T)}-U_{prev})/\blacktriangle \qquad (1)$$

$$dP_{(T)}/dT=(P_{(T)}-P_{prev})/\blacktriangle \qquad (2)$$

If the magnitude of $dP_{(T)}/dT$ is greater than or equal to one half times the magnitude of $(dU_{(T)}/dT)$, then the correct mask threshold, $T_o$, is found by subtracting one half of , the incremental change in T, from the current value of T, i.e. $T_o=T-0.5(\blacktriangle)$. Otherwise, $U_{(T)}$ and $P_{(T)}$ are saved off as previous values and T is incremented by delta and a new reference image is input. The process of finding new $P_{(T)}$ and $U_{(T)}$ is continued until the condition $|dP_{(T)}/dT| \geq 0.5*|dU_{(T)}/dT|$ is satisfied.

This algorithm has been successfully implemented in maskable bilevel correlator and tested under field conditions. Referring to FIG. 6, a flowchart illustrating one possible method of performing the process of the present invention is shown. From the START block 21, the logic flows to a block 23 entitled LOCK SENSOR TO SCENE. This step effectively fixes the array of data at the rows and columns of pixels of the live image. This can be also thought of as taking a snapshot of the scene under view, or fixing a changing picture as it appeared at a single time.

Next, the logic flows to a block 25 entitled INITIALIZE T TO $T_{MIN}$ where $T_{MIN}$ may be either a user specified minimum threshold or preferably calculated as the standard deviation of the noise divided by two. The next block in the logic sequence is EXTRACT MASK AND POLARITY BITS FROM IMAGE block 27 in which the $T_{MIN}$ is used to segregate the noise dominated pixels from the signal dominated pixels. Next, the logic proceeds to a block 28 entitled EXTRACT MASK AND POLARITY BITS FROM LIVE IMAGE. In this manner, both the live image and reference image bits will have been generated using the same threshold. The logic flow then proceeds to the COUNT NUMBER OF UNMASKED PIXELS block 29 where the number of unmasked pixels are recorded to be utilized to insure that the proper $T_{MIN}$ will be computed.

The next logic block 31, CORRELATE UNMASKED PIXELS OF LIVE AND REFERENCE IMAGE AND COMPUTE AVERAGE PEAK CORRELATION, correlates the unmasked pixels of the reference with the unmasked pixels of the current image frame, forms a peak correlation for the current frame, and averages the peak correlation of the current frame with the peak correlation for the subsequent frames to form an average peak correlation.

Next, a decision block 33, $T=T_{MIN}$?, is for the purpose of avoiding a computation which is not proper for the first time through the program. If $T=T_{MIN}$, the next two blocks of logic are bypassed. If T is other than $T_{MIN}$, the logic moves to a computation block 35 where $(dU_{(T)}/dT)$ and $(dP_{(T)}/dT)$ are computed according to equations (1) and (2) above. The next logic block is a decision block 37 entitled IS $|dP/dT| \geq \frac{1}{2}|dU/dT|$? where, for FIG. 6 the subscripts are omitted for convenience. If the condition is met, the proper threshold is considered to have been essentially found. Since the decision is based on an inequality, it is probable that the actual best threshold is halfway between the threshold which first satisfied the inequality and the previous threshold which did not satisfy the inequality. If block 37 arrives at a yes answer, the logic flows to a computation block 39 where the threshold $T_o$ is set equal to the threshold T at which decision block 37 was just satisfied, minus ▲/2, which is one-half the distance from the current threshold T to the previous threshold at which decision block 37 was not satisfied. From computation block 37, the logic flows to a STOP block 41.

The current computation really assumes that the signal to noise ratio will either improve or remain unchanged with time. However, instead of stop block 41, the logic could be set to loop back into the logic stream either directly, or by a decision based upon whether $|dP_{(T)}/dT|$ is within an upper and lower range of $\frac{1}{2}|dU_{(T)}/dT|$. Such controls could provide for optimization in the event that the signal to noise ratio is diminished over time.

If the test of block 37 is not met, the logic proceeds to a computation block 43. Also entering computation block 43 is the logic from a yes decision at block 33, in the case where $T=T_{MIN}$. Block 43 updates the value of both of the previous values of the correlation peak $P_{(T)}$, and the unmasked pixels $U_{(T)}$, for comparison with what will be newly computed values of $U_{(T)}$ and $P_{(T)}$ in the upper portion of the flow chart. Next, the logic proceeds to a computation block 45 where the current threshold T value is incremented by ▲. The logic then flows upward to the flowpath between blocks 25 and 27, entering block 27 where the extraction of the reference from the next image occurs. This is the point at which another computation begins for the next frame of data or next image.

The foregoing disclosure and description of the invention are illustrative and explanatory thereof, and various changes in the values, tolerances, logic flow, and manner of computation of the threshold may be constructed and performed, without departing from the spirit and scope of the invention.

What is claimed is:

1. A system for selecting an optimum mask threshold utilizing the correlation of two input signals associated with a live image and a reference image, the improvement comprising:

means for defining the live image as a set of pixels, wherein each live image pixel has an intensity representation;

means for defining the reference image as a set of pixels, wherein each reference image pixel has an intensity representation;

means for defining an image threshold range;

means for processing a reference image signal from the reference image, said reference image signal including reference polarity bits for those pixels having an intensity outside of the threshold range and reference mask bits for those pixels having an intensity within the threshold range;

means for processing a live image signal from the live image, said live image signal including polarity bits for those pixels having an intensity outside of the threshold range and mask bits for those pixels having an intensity within the threshold range;

means connected to said means for processing a live image signal and said means for processing a reference image signal, for correlating said polarity bits of said reference and said live image signals to find a peak correlation, said means for correlating disregarding the mask bits; and means connected to both said means for processing, for automatically adjusting said image threshold range to maximize said peak correlation and for identifying the magnitude of said image threshold range associated with said peak correlation, wherein the means for adjusting the image threshold range adjusts the image threshold range depending on a predetermined relationship between the peak correlation and the threshold range.

2. The system of claim 1 wherein said input signals comprise a series of frames of information, and wherein said means for automatically adjusting said image threshold range performs said adjustment for use with subsequent frames of information based upon the correlation of prior frames of information.

3. The system of claim 1 wherein said means for automatically adjusting said image threshold range performs said adjustment until said peak correlation is identified.

4. The system of claim 1 wherein said means for automatically adjusting said image threshold range adjusts said image threshold range among a finite set of trial thresholds.

5. The system of claim 1 wherein said image threshold range is initially set to a minimum level.

6. The system of claim 5 further comprising means for measuring the noise in said live image signal, and wherein said :means for automatically adjusting said image threshold range adjusts said image threshold range from said minimum level by an amount which is a fixed multiple of said measured noise in said live image signal.

7. The system of claim 6 wherein said fixed multiple is equivalent to about half of the noise standard deviation.

8. The system of claim 1 further comprising means for identifying the number of polarity bits in said live image signal and wherein said means for automatically adjusting said image threshold range ceases adjusting said image threshold when the change in the absolute value of the peak correlation per unit change in threshold is at least twice the change in the absolute value of the number of polarity bits per unit change in threshold.

9. The system of claim 6 further comprising means for identifying the number of polarity bits in said live image signal and wherein said means for automatically adjusting said image threshold range ceases adjusting said image threshold range when the change in the absolute value of the peak correlation per unit change in threshold is at least twice the change in the absolute value of the number of polarity bits per unit change in threshold.

10. The system of claim 9 wherein, once a threshold is computed such that said change in the absolute value of the peak correlation per unit change in threshold is at least twice the change in the absolute value of the number of polarity bits per unit change in threshold is found, the threshold is reduced by one half of said fixed multiple of said measured noise in said live image signal, to yield a final threshold associated with said peak correlation.

11. The system of claim 1 wherein said threshold is a finite magnitude above and below a given level.

12. A process of correlating two input signals associated with a live image and a reference image, comprising the steps of:
defining the live image as a set of pixels, wherein each live image pixel has an intensity representation;
defining the reference image as a set of pixels, wherein each reference image pixel has an intensity representation;
defining an image threshold range;
establishing a reference image signal from the reference image, said reference image signal including reference polarity bits for those pixels having an intensity outside of the threshold range and mask bits for those pixels having an intensity within the threshold range;
establishing a live image signal from the live image, said live image signal including live image polarity bits for those pixels having an intensity outside of the threshold range and mask bits for those pixels having an intensity within the threshold range;
correlating said polarity bits of said reference image signal and said polarity bits of said live image signal to establish a peak correlation, said step of correlating disregarding the mask bits;
adjusting said image threshold range to maximize said peak correlation depending on a predetermined relationship between the peak correlation and the threshold range; and,
identifying the magnitude of said image threshold range associated with said maximized peak correlation.

13. The process of claim 12 wherein said input signals further comprise a series of frames of information, and wherein said establishing steps are performed on said series of frames of information, and wherein said establishing a reference image signal step is performed on a frame of information, and wherein said establishing a live image signal step is performed on at least one subsequent frame of information and said adjusting said image threshold range step is performed for said at least one subsequent frame of information, and wherein said identified magnitude of said image threshold range associated with said peak correlation becomes an image threshold for further frames of information.

14. The process of claim 13 wherein said establishing a live image signal step and said correlating step occurs for N subsequent frames before said adjusting step multiple times, and wherein the correlation function is averaged to form an average peak correlation function, where N is an integer number.

15. The process of claim 14 wherein said adjusting image threshold range step continues until the change in the absolute value of the peak correlation per unit change in threshold is at least twice the change in the absolute value of the number of polarity bits per unit change in threshold.

16. The process of claim 12 wherein said image threshold is initially set to a minimum level.

17. The process of claim 16 further comprising the step of measuring the noise in said live image signal and wherein said minimum level is equal to one half of the standard deviation of the measured noise of said live image signal.

18. The process of claim 17 further comprising the step of adjusting said set of image thresholds from said minimum level by an amount which is a fixed multiple of said measured noise in said live image signal.

19. The process of claim 12 further comprising the step of identifying the number of polarity bits in said live image signal; and, ceasing to adjust said image threshold when the change in the number of polarity bits in said live image signal per unit change in threshold is at least twice the change in said peak correlation per unit change in threshold.

* * * * *